Nov. 19, 1929.  R. P. DUNMIRE ET AL  1,736,150
CONDUIT FITTING
Filed Oct. 30, 1925

Inventors
Russell P. Dunmire
Dorsey E. Kellogg
By
Attorney

Patented Nov. 19, 1929

1,736,150

UNITED STATES PATENT OFFICE

RUSSELL P. DUNMIRE AND DORCEY E. KELLOGG, OF ERIE, PENNSYLVANIA, ASSIGNORS TO ERIE MALLEABLE IRON COMPANY, OF ERIE, PENNSYLVANIA, A CORPORATION OF PENNSYLVANIA

CONDUIT FITTING

Application filed October 30, 1925. Serial No. 65,826.

This invention is directed to the improving of conduit fittings designed to secure threadless conduits, improving the simplicity and convenience and facility with which such fittings may be applied. Features and details of the invention will appear from the specification and claims.

The invention is illustrated in the accompanying drawings as follows:—

Figure 1:
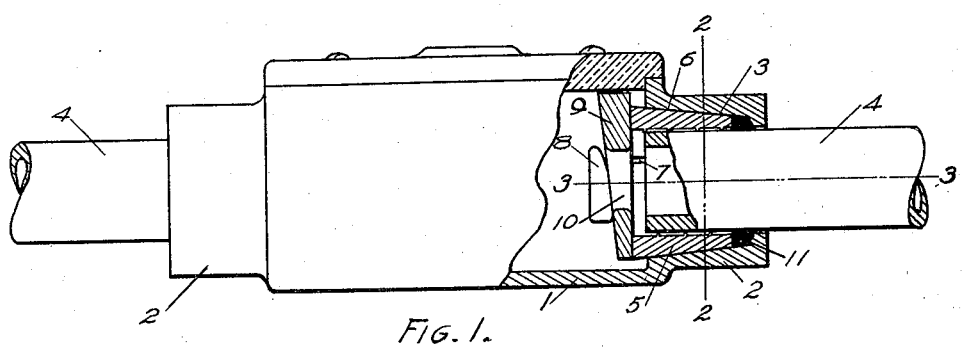

Fig. 1 shows a side elevation, partly in section.

Figure 2:
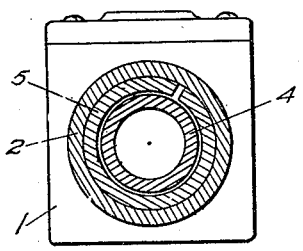

Fig. 2 a section on the line 2—2 in Fig. 1.

Figure 3:
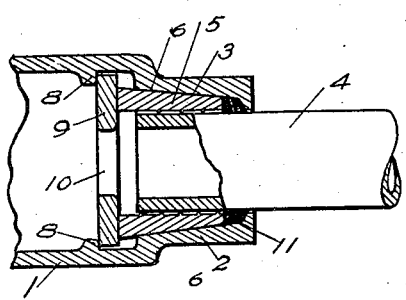

Fig. 3 a section on the line 3—3 in Fig. 1.

Figure 4:
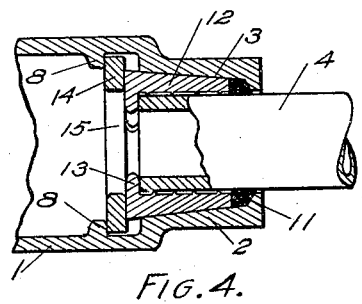

Fig. 4 a central section of an alternative construction.

1 marks the body of the fitting which as exemplified is in the form of a conduit box, and 2 a conduit receiving extension having a tapered opening 3 preferably smaller at its outer end and in which is received a conduit 4.

A sleeve 5 having a tapered surface 6 conforming to the opening 3 is arranged in the opening. This sleeve is made contractible by a longitudinal slot 7 which extends through it.

Shoulders 8 are arranged in the side walls of the box at the sides of the opening and a wedge 9 is driven between the shoulders 8 and the ends of the sleeve 5. The wedge has an opening 10 for the conductor as it is led from the conduit. The walls of this opening are preferably so proportioned relatively to the conduit as to form a guard shoulder for the conduit and a protecting edge for the conductor drawn through the conduit.

A gasket 11 is arranged at the outer end of the opening 3 and is compressed as the sleeve 5 is forced outwardly by the wedge.

The construction shown in Fig. 4 is similar to the construction shown in Fig. 1 except that a sleeve 12 differs from the sleeve 5 in that it has a guard shoulder 13 for the conduit and a wedge 14 is provided with an opening 15 larger than the opening 10.

What is claimed as new is:—

1. In a conduit fitting, the combination of a body having a conduit opening therein and a shoulder adjacent to the opening; a slotted contractible sleeve in the opening, the walls of the opening and the sleeve having wedging surfaces in wedging engagement said sleeve being adapted to clamp an inserted conduit as the sleeve is forced endwise in the opening, the walls of the sleeve being thicker at one end than the other; and a wedge acting between the shoulder and the thicker end of the sleeve pushing the sleeve into the opening to contract the same.

2. In a conduit fitting, the combination of a body having a conduit opening therein and a shoulder adjacent to the opening; a slotted contractible sleeve in the opening, the walls of the opening and the sleeve having wedging surfaces in wedging engagement said sleeve being adapted to clamp an inserted conduit as the sleeve is forced endwise in the opening, the walls of the sleeve being thicker at one end than the other, and a wedge acting between the shoulder and the thicker end of the sleeve pushing the sleeve into the opening to contract the same, said wedge having a conductor opening therethrough.

3. In a conduit fitting, the combination of a body having a conduit opening therein and a shoulder adjacent to the opening; a slotted contractible sleeve in the opening, the walls of the opening and the sleeve having wedging surfaces, said wedging surfaces being larger at the inner end and contracting the sleeve through their engagement as the sleeve is forced outwardly endwise in the opening; and a wedge in the body between the shoulder and the inner end of the sleeve pushing the sleeve into the opening.

4. In a conduit fitting, the combination of a body having a conduit opening therein and a wedge shoulder at the side of the opening; a slotted contractible sleeve in the opening, the walls of the opening and the sleeve having wedging surfaces in wedging engagement adapted to contract the sleeve into clamping engagement with an inserted conduit as the sleeve is forced endwise; and a wedge between the end of the sleeve and the wedge shoulder.

5. In a conduit fitting, the combination of a body having a conduit opening therein and a wedge shoulder at the side of the opening; a slotted contractible sleeve in the opening, the walls of the opening and sleeve having wedging surfaces in wedging engagement and adapted to clamp an inserted conduit as the sleeve is moved endwise in the opening; and a wedge between the end of the sleeve and the wedge shoulder, said wedge having a conductor opening therethrough.

6. In a conduit fitting, the combination of a body having a conduit opening therein and a wedge shoulder at the side of the opening; a slotted contractible sleeve in the opening, the walls of the opening and the sleeve having wedging surfaces in wedging engagement and adapted to clamp an inserted conduit as the sleeve is moved endwise, and a wedge between the end of the sleeve and the wedge shoulder, said wedge having a conductor opening therethrough, the walls of the opening having a guard shoulder for the conduit.

7. In a conduit fitting, the combination of a body having a conduit opening therein and a shoulder at the side of the opening; a slotted contractible sleeve in the opening, the walls of the opening and the sleeve having wedging surfaces in wedging engagement, the sleeve being adapted to clamp an inserted conduit as the sleeve is forced endwise; and means operating against the shoulder and the sleeve exerting thrust on the sleeve to force the sleeve endwise.

8. In a conduit fitting, the combination of a body having a conduit opening therein and a shoulder at the side of and adjacent to the inner end of the opening; a slotted contractible sleeve in the opening, the walls of the opening and the sleeve having wedging surfaces in wedging engagement, the sleeve being adapted to clamp an inserted conduit as the sleeve is forced endwise; and means operating against the shoulder and the sleeve exerting thrust on the sleeve to force the sleeve endwise.

In testimony whereof we have hereunto set our hands.

RUSSELL P. DUNMIRE.
DORCEY E. KELLOGG.